United States Patent
Bourdelais et al.

(10) Patent No.: US 6,825,983 B2
(45) Date of Patent: Nov. 30, 2004

(54) OPTICAL ELEMENT CONTAINING AN INTERFERENCE FRINGE FILTER

(75) Inventors: Robert P. Bourdelais, Pittsford, NY (US); Cathy Fleischer, Rochester, NY (US); James F. Elman, Fairport, NY (US); Cheryl J. Kaminsky, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 51 days.

(21) Appl. No.: 10/213,222

(22) Filed: Aug. 6, 2002

(65) Prior Publication Data

US 2004/0027672 A1 Feb. 12, 2004

(51) Int. Cl.⁷ .................................................. G02B 1/10
(52) U.S. Cl. ........................ 359/586; 359/587; 359/589; 359/707; 359/626; 359/622; 359/599; 349/95
(58) Field of Search ................................. 359/586, 587, 359/589, 599, 707, 626, 628, 622–624; 349/95, 64; 428/212

(56) References Cited

U.S. PATENT DOCUMENTS

| | | | |
|---|---|---|---|
| 5,882,774 A | 3/1999 | Jonza et al. | |
| 6,030,756 A | 2/2000 | Bourdelais et al. | |
| 6,177,153 B1 | 1/2001 | Uchiyama et al. | |
| 6,266,476 B1 | 7/2001 | Shie et al. | |
| 6,641,900 B2 * | 11/2003 | Hebrink et al. | ............. 428/212 |

OTHER PUBLICATIONS

R. P. Bourdelais et al, "Surface Formed Complex Polymer Lenses for Visible Light Diffusion", USSN 10/095,204 (D–83692) filed Mar. 11, 2002.

C. J. Kaminsky et al, "Light Diffuser with Colored Variable Diffusion", USSN 10/147,659 (D–84407) filed May 16, 2002.

* cited by examiner

*Primary Examiner*—Fayez Assaf
(74) *Attorney, Agent, or Firm*—Arthur E. Kluegel

(57) ABSTRACT

Disclosed is an optical element comprising in order a light source, air, at least one thin layer having a thickness of 80 to 200 nm, and a thick layer, each layer varying in refractive index (RI) by at least 0.05 from the next adjacent layer, in an alternating manner.

37 Claims, 2 Drawing Sheets

OPTICAL ELEMENT CONTAINING AN INTERFERENCE FRINGE FILTER

CROSS REFERENCE TO RELATED APPLICATIONS

This application is related to application Ser. No. 10/095,204 now, U.S. Pat. No. 6,721,102 B2 filed Mar. 11, 2002.

FIELD OF THE INVENTION

The invention relates to a diffuser for specular light. In a preferred form, the invention relates to a back light diffuser containing a light director for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need for a separate film. In the case of light management in a LCD, this increases efficiency by removing an interface (which causes reflection and lost light).

Typically, prior art light diffusers for liquid crystal display devices utilize edge or perimeter printing of the light diffuser to direct light away from the edges of the display were the light is typically absorbed into the LCD frame. Light adsorbed into the LCD frame is lost light energy in that absorbed illumination light energy can not be used to illuminate the LC image. Prior art diffusers for LCD devices are typically printed with white, reflecting dots around the perimeter that provide specular reflection of perimeter light so that some of the perimeter light can be "recycled" by the illumination components away from the perimeter. While the printing of white reflective dots does reduce the amount of absorbed light energy by the LCD frame, perimeter printing is expensive in that it requires an additional printing operation. Further, the perimeter printing of the light diffuser has been generally shown to reduce edge absorption by 30%. It would be desirable to re-direct incident illumination light energy back toward the center of the device and further reduce the amount of wasted illumination light energy absorbed by device frames that utilize light diffusers.

In U.S. Pat. No. 6,270,697 (Meyers et al.), blur films are used to transmit infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. The materials disclosed in U.S. Pat. No. 6,266,476 shape and collimate light and therefore are not efficient diffusers of light particularly for liquid crystal display devices.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

The U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light.

In U.S. Pat. No. 5,223,383 photographic elements containing reflective or diffusely transmissive supports are disclosed. While the materials and methods disclosed in this patent are suitable for reflective photographic products, the % light energy transmission (less than 40%) is not suitable for liquid crystal display as % light transmission less than 40% would unacceptable reduce the brightness of the LC device.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission which is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

In U.S. Pat. No. 5,882,774, birefringent multilayer optical films in which the refractive indices in the thickness direction of two adjacent layers are substantially matched have a Brewster angle (the angle at which reflectance of p-polarized light goes to zero) which is very large or is nonexistent. This allows for the construction of multilayer mirrors and polarizers whose reflectivity for p-polarized light decreases slowly with angle of incidence, are independent of angle of incidence, or increase with angle of incidence away from the normal. As a result, multilayer films having high reflectivity (for both planes of polarization for any incident direction in the case of mirrors, and for the selected direction in the case of polarizers) over a wide bandwidth, is disclosed. The web material in U.S. Pat. No. 5,882,774 has utility as a reflection material, as the light transmission of the web material is approximately 10% to 40%. Further the web material contains color differences as a function of incident light angle and viewing angle making the web material useful for decorative purposes.

Typically, liquid crystal display (LCD) devices contain a CCFL backlighting to illuminate the LCD matrix. The color temperature of the light is carefully controlled by backlighting manufacturers to provide either monochromatic light or white light. The color of the CCFL light sources is typically controlled by the addition of pigments in the CCFL. It would be desirable to provide an optical element that could provide color filtering of the CCFL light source to provide a more consistent illumination source, filter unwanted wave lengths of light or provide monochromatic illumination utilizing a white back light source while providing high light transmission to maintain the brightness of the display.

PROBLEM TO BE SOLVED BY THE INVENTION

There remains a need for an optical element to provide color filtering of illumination light sources. Additionally needed is improved light diffusion of image illumination light sources to provide improved diffuse light transmission while simultaneously diffusing specular light sources and filtering the illumination light source.

SUMMARY OF THE INVENTION

The invention provides an optical element comprising in order a light source, air, at least one thin layer having a thickness of 80 to 200 nm, and a thick layer, each layer varying in refractive index (RI) by at least 0.05 from the next adjacent layer, in an alternating manner. The invention also provides both optical filtering and light diffusion.

ADVANTAGEOUS EFFECT OF THE INVENTION

The invention provides improved light transmission while simultaneously diffusing specular light sources and filtering illumination light sources.

DETAILED DESCRIPTION OF THE INVENTION

Figure 1:
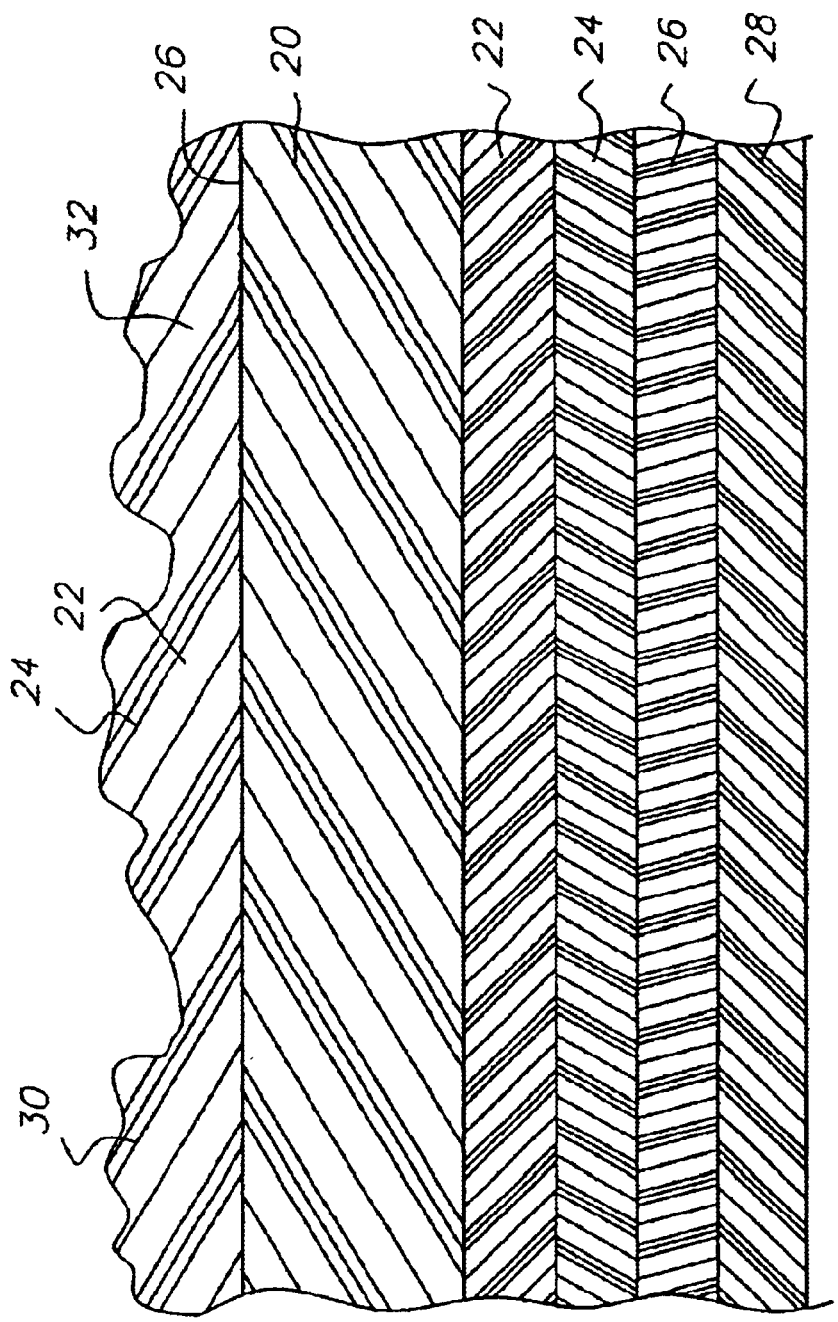
FIG. 1 illustrates a cross section of an optical filtering element utilizing an interference fringe filter suitable for use in a liquid crystal display device.

The invention has numerous advantages over prior practices in the art. The invention provides color filtering for white illumination light sources, provides monochromatic light from a white source or improves the color illumination light sources. It is well known that illumination light sources, mainly CCFL types, do not provide uniform white light. By providing an optical element that filters unwanted wave lengths of light or an optical element that evens the peak intensity of the red, green or blue components of the white light, the quality of the illuminated images is improved. The optical filter of the invention is a color correcting filter rather than a notch filter. The optical element of the invention has been shown to selectively reduce the transmission of specific wavelengths of white light by 25% compared to notch filters which reduce specific wavelength transmission by greater than 90%. Therefore the optical element of the invention is ideal for color correction of a white light source for display devices, adjusting the color balance of the illumination light source before the light enters the image pixel array.

The optical element of the invention containing a color filter does not contain pigment chemistry, which tends to scatter light. Rather the color filter of the invention is translucent allowing for high light transmission. High light transmission is a critical factor for LCD devices in that higher light transmission allows for a brighter image as more light energy is available to illuminate the LCD dyes. The optical element of the invention also provides color filtering without the use of dye chemistry, which typically fades from extended exposure to light energy and ultraviolet energy. A color filter that does not fade provides allows the optical element to provide a consistent color that will not degrade over time.

The invention also provides both color filtering and diffusion of specular light sources that are commonly used in rear projection display devices such as liquid crystal display devices. The light diffuser, typically located between the light source and the polarization screens in LCD devices provides an opportunity to both diffuse and filter light before polarization. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The surface lenslet structure polymer layer of the invention can be easily changed to achieve the desired diffusion and light transmission requirements for many liquid crystal devices thus allowing the invention materials to be responsive to the rapidly changing product requirements in the liquid crystal display market. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo-and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y direction in the plane of the film. The term "pattern" means any predetermined arrangement of lenses whether regular or random. "Color filter" means a substantially transparent optical element that absorbs some wavelengths more than others.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, micro-voided polymer film, or coating the film with matte resins or beads. The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets in which the minor lenses are formed randomly on top of. "Minor lenses" mean lenses smaller than the major lenses that are formed on the major lens. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinnier complex lens. The complex lenses may differ in size, shape, offset from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, or that the direction of the peak light transmission is not along the direction θ=0°, but is in a direction non-normal to the surface. There are at least three approaches available for making the light disperse asymmetrically from a lenslet diffusion film, namely, changing the dimension of the lenses in one direction relative to an orthogonal direction, offsetting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

An optical element comprising in order a light source, air, at least one thin layer having a thickness of 100 to 200 nm, and a thick layer, the adjacent layers varying from each other in RI by at least 0.05, provided that in the case of two or more thin layers the RI varies in an alternating manner is preferred. By providing alternating layers that vary in refractive index in alternating positive and negative directions, the optical element selectively filters transmitted light. The thickness of the alternating layers and the refractive index of the alternating layers are selected to provide filtering for transmitted light.

The optical element of the invention wherein the adjacent layers vary from each other in refractive index by at least 0.10 are preferred. By varying the refractive index of the adjacent layers, the optical fringe filter of the invention provides specific wavelength transmission less than 80% which leads to effective color filtration for rear illuminated displays such as LCD.

In a preferred embodiment of the invention, the optical element comprises between 3 to 30 layers. Optical elements with less than 3 layers have been shown to provide poor light filtration. Optical elements with greater than 35 layers are difficult to manufacture and therefore are not cost justified. Also, as the number of layers increases, the wave amplitude as a function of transmission increases providing more uniform transmission. In another preferred embodiment of the invention, the optical element comprises between 3 and 8 layers. Optical elements with less than 3 layers have been shown to provide poor light filtration. Optical elements that contain 3 to eight layers have been shown to provide sufficient light filtration and are low in cost as between 3 and 8 layers can be coated simultaneously utilizing a slot die coating method.

In another preferred embodiment the thick layer preferably has a layer thickness between 1000 and 5000 nanometers. More preferably the thick layer has a thickness from 80 to 1000 nanometers. Layer thickness less than 70 nanometers are both difficult to apply to a substrate and begin to interfere with the transmission of light. Layer thickness greater than 5000 nanometers are expensive and the filtering efficiency of the invention is reduced. By balancing materials cost, coating efficiency of the layers and filtering performance, the most preferred transmitted light filter have a thick layer thickness of between 80 to 1000 nanometers.

The optical element of the invention preferably provides color filtration. Colored filtration, that is filtration of light energy between 400 and 700 nanometers provides visual filtration of transmitted light. Filtration of transmitted light is useful in a transmission display devices such as liquid crystal devices to correct the color of the light sources or to provide a specific color, red for example, to a white light source.

Preferably, the colored transmission of the optical element of the invention corresponds to a color wavelength band of 10 to 70 nanometers wide. This creates a colored variable diffuser with a very specific narrow color band. Having a narrow color band can very selectively transmit or block light of varying wavelengths tailoring the light. It has been shown that producing a narrow color band of light creates a more "pure" color of light and is more efficient for use in liquid crystal display color matrixes because the red, green, and blue color filters only transmit specific wavelengths of light.

The optical element wherein the chromatic transmission comprises yellow light at 570 to 620 nm is preferred. In another embodiment of the invention, the chromatic transmission comprises magenta light at 630 to 690 nm and 425 to 480 nm is preferred. Preferably, the chromatic transmission comprises cyan light at 480 to 520 nm. In another embodiment of the invention, the chromatic transmission comprises red light at 630 to 690 nm. The preferred diffuse transmission comprises green light at 525 to 590 nm. For another application, the preferred diffuse transmission comprises blue light at 425 to 480 nm. The desired chromatic transmission color depends on the application and use.

The optical element of the invention preferably has a thickness between 300 and 3000 nanometers. Optical elements less than 200 nanometers are difficult to manufacture and are not robust to vibration found in portable devices such as LC devices. Optical elements greater than 3500 nanometers are expensive to manufacture and significantly reduce the transmission of light energy reducing the utility of the invention by reducing the system brightness of rear illuminated display devices.

The layers of the optical element of the invention preferably comprise polymers. Polymers are inexpensive, easy to form discrete high precision thin layers that can be coated using coating dies that have multiple slots thus allowing multiple layers to be coated simultaneously. Further, polymers are typically durable and have half-lives that exceed the lifetime of transmission displays.

Figure 3:
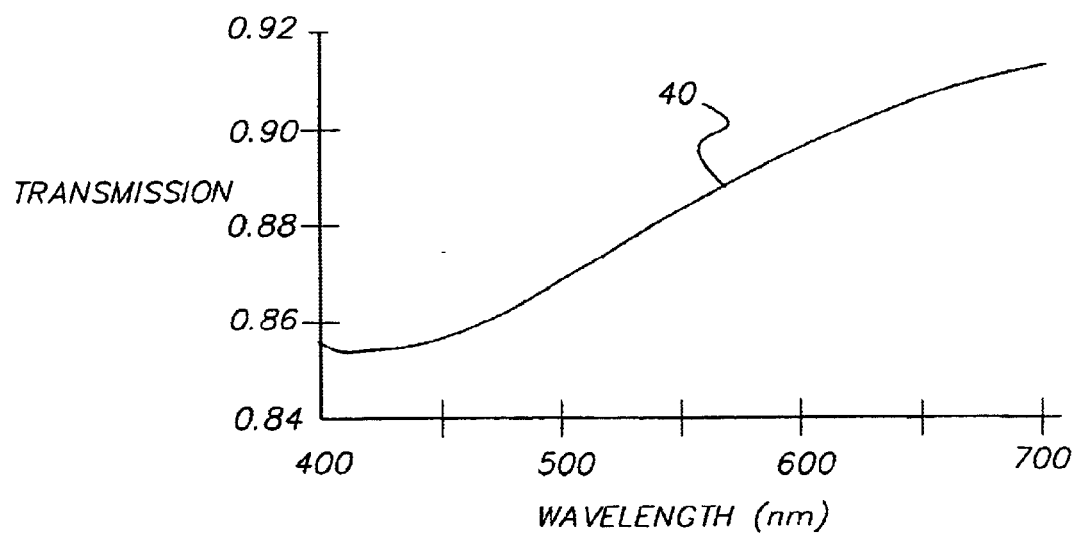
FIG. 3 illustrates a graph of wavelength vs transmission for PEN and silicone applied to a polycarbonate base.

In a preferred embodiment of the invention, the alternating layers comprise PEN, silicone and polycarbonate. FIG. 3 illustrates a graph of wavelength vs transmission for alternating layers of PEN and silicone applied to a polycarbonate base. The alternating layers of PEN and silicone to create a color filter is preferred as the graph in FIG. 3 shows the blue light being filtered more that the red light providing a transmitted light that has a red tint. Curve 40 shows the relationship between wavelength and transmission over the visible spectrum of light. The index of refraction of the silicone in FIG. 3 was 1.41 and the index of refraction of the PEN was 1.765 both measured at 550 nm light. The graph in FIG. 3 is for 6 alternating layers and the thickness of the PEN was 1500 angstroms. The alternating layers of PEN and silicone were coated on a low birefringent polycarbonate base. The optical performance of the invention materials in FIG. 3 provides chromatic transmission peak at 700 nm.

Figure 2:
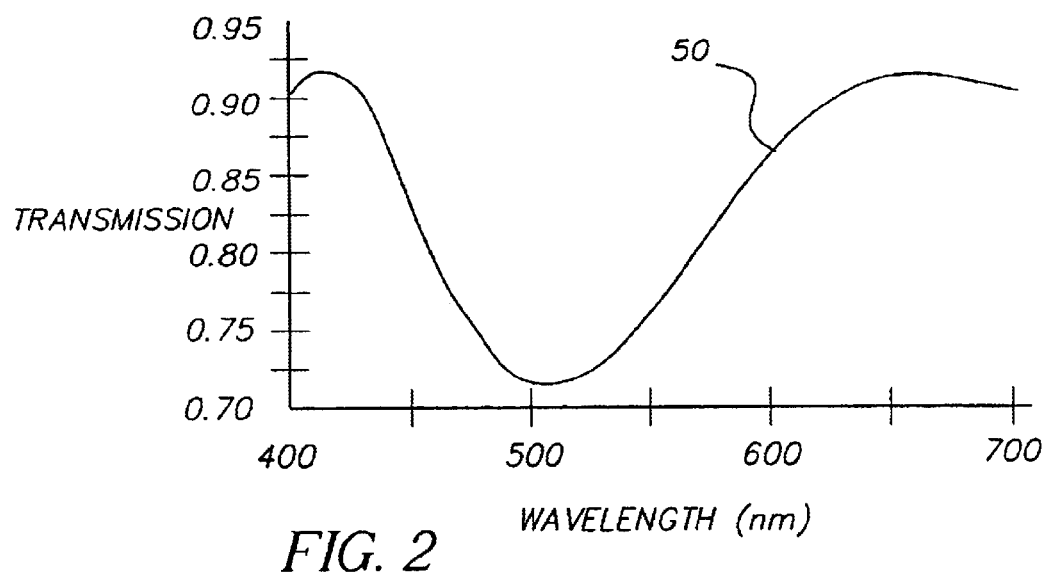
FIG. 2 illustrates a graph of wavelength vs transmission for acetate and polycarbonate applied to a polyester base.

In another preferred embodiment of the invention, the alternating layers comprise polycarbonate, acetate and polyester. FIG. 2 illustrates a graph of wavelength vs transmission for acetate and polycarbonate applied to a polyester base. FIG. 2 shows the relationship between wavelength and % transmission for 6 alternating layers of acetate and polycarbonate on polyester. Curve 50 shows that the alternating layers provide high light transmission at 400 and 700 nanometers and a filtering maximum at 510 nanometers. The alternating layers of acetate and polycarbonate were 900 angstroms thick. The optical performance of the invention materials in FIG. 2 provides chromatic transmission peak at 650 nm.

Alternating layers of silicone and PEN and alternating layers of acetate and polycarbonate are preferred because the index of refraction difference is greater than 0.10. Also silicone, PEN, acetate and polycarbonate are easily precision-coated using solvent dispersions of the polymers and slot die coating the preferred polymers. Other combinations of polymers are also preferred if the index of refraction between the alternating layers is greater than 0.05.

In a preferred embodiment of the invention, the optical element is applied to glass. Glass provides a rigid substrate that is typically utilized in display devices. Further, glass has low moisture and oxygen permeability which allows the optical element of the invention to be used with display systems that utilize moisture sensitive chemistry such as OLEDs or phosphors.

In another preferred embodiment of the invention, the optical element is applied to the surface of a waveguide. Application of the optical element to a waveguide allows the optical waveguide to both guide light and provide color filtered light. An example would be the acrylic waveguides currently used in liquid crystal devices. The optical element of the invention applied to the acrylic wave guide would replace tinting of the CCFL light sources in an LC device or provide filtration of "white" light to better even the amount of red, green and blue light.

In further embodiment of the invention, the optical element is applied to the surface of a polymer prism sheet that selectively collimates light prior to a polarization sheet in a LC device. By providing the color filtration to a prism sheet, the prism sheet an both improve the brightness of the LC and filter unwanted light to provide a higher quality display.

In another embodiment of the invention, the optical element is applied to a reflective surface. A reflective surface with the optical element of the invention provides colored reflective light. Colored reflective light can be used to provide, for example, colored bar codes, decorative materials or a colored reflective back plane to a waveguide. Examples of reflective materials include smooth metallic surfaces such as vapor deposited aluminum, gold, silver, nickel and the like. Examples of other reflective surfaces include silicon, white pigmented polymers and smooth polymers such as PET or polyolefin.

In a further embodiment of the invention, the optical element is applied to the surface of a transflector. A transflector is an optical device that both transmits and reflects light. Transflectors are useful for allowing portable display devices such as LC devices to be used in ambient sunlight where the ambient light is used to illuminate the LC image. By applying the optical element of the invention to a transflector, both the reflected ambient light and the transmitted light can be color filtered. In a special case, by applying the optical element selectively to one side of the transflector, either the transmitted or the reflected light can be filtered. Selective filtering either in the transmission mode or reflection mode allows for color shift when a portable device is utilizing ambient light in the reflection mode compared to transmission light in the transmission mode.

In another preferred embodiment of the invention, the optical element is applied to the surface of a light bulb. By applying the optical element of the invention to the surface of a light bulb, the light source, a tungsten filament or fluorescent material for example, can be colored filtered to be monochromatic source or color filtered to provide a more pleasing blue hue light for example. The optical element may be applied to either the interior of the light bulb or the exterior of the light bulb. As a special case, if the optical element is applied to the interior or exterior of a tungsten filament bulb, as the temperature of the bulb increases, the spacing of the alternating layers of the invention will change creating a pleasing color shift. For example, the light could start as a blue light and move to a red light as the spacing between the alternating layers increases because of the thermal expansion of the alternating layers.

In a further embodiment of the invention, the optical element is applied to a polarization film. By applying the optical element to a polarization film, polarized light can be color filtered for display devices or sunglasses for example.

In another embodiment of the invention, the optical element is applied to the surface of low birefringence acetate. By applying the optical element of the invention to low biferingent acetate the optical element has low birefringence allowing the material to be used in LC devices where low birefringence is important. Low birefringence acetate combined with the optical element of the invention can also be utilized as a base for color negative film chemistry to selectively filter unwanted wavelengths of printing light energy.

In a further embodiment of the invention, the optical element is applied to the surface of a light diffuser. Application of the optical element to the surface of a light diffuser allows for a light diffuser to both diffuse light and selectively filter light. Application include LC devices, greenhouses, front projection devices, over-laminate materials and covers for flashlights. Complex lenses have been shown to provide excellent diffusion of illumination incident light. Complex lenses comprise concave or convex shapes that contain multiple diffusion surfaces. A complex lens light diffuser that utilizes a light director is both an excellent light diffuser and bright as perimeter light energy is focused toward the center area of the light diffuser. Further, complex lenses are typically formed from polymer and thus the formation of the light director can occur while the complex lenses are being formed, providing a low cost method of improving the brightness of LC devices. A transparent polymeric film having a top and bottom surface comprising a plurality of convex or concave complex lenses on the surface of the transparent polymeric film is preferred for the light diffuser. Curved concave and convex polymer lenses have been shown to provide very efficient diffusion of light. Further, the polymer lenses of the invention are transparent, allowing a high transmission of light allowing the brightness of LC displays to emit more light.

The concave or complex lenses on the surface of the polymer film light diffuser are preferably randomly placed. Random placement of lenses increases the diffusion efficiency of the invention materials. Further, by avoiding a concave or convex placement of lenses that is ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device.

In one embodiment of the invention, convex lenses are present on the top surface and convex lenses are present on the bottom surface of the transparent polymeric film. The placement of convex lenses on both sides of the polymer film creates stand off from other adjacent films providing the necessary air gap required for efficient diffusion by the lenses.

In another embodiment of the invention, convex lenses are present on the top surface and concave lenses are present on the bottom surface of the transparent polymeric film. The placement of convex lenses on the top side of the polymer film creates stand off from other adjacent films providing the necessary air gap required for efficient diffusion by the lenses. The placement of concave lenses on the bottom side of the polymer film creates a surface that can be in optical contact with the adjacent films and still effectively diffuse the light.

In another embodiment of the invention, concave lenses are present on the top surface and concave lenses are present on the bottom surface of the transparent polymeric film. The placement of concave lenses on both sides of the polymer film creates a surface that can be in optical contact with the adjacent films on either side and still effectively diffuse the light.

In another embodiment of the invention, concave lenses are present on the top surface and convex lenses are present on the bottom surface of the transparent polymeric film. The placement of concave lenses on the top side of the polymer film creates a surface that can be in optical contact with the adjacent films and still effectively diffuse the light. The placement of convex lenses on the bottom side of the polymer film creates stand off from other adjacent films providing the necessary air gap required for efficient diffusion by the lenses.

Preferably, the concave or convex lenses have an average frequency in any direction of between 4 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm creates lenses that are too large and therefore diffuse the light less efficiently. Concave or convex lenses with an average frequency in any direction of between 22 and 66 complex lenses/mm are most preferred. It has been shown that an average frequency of between 22 and 6 complex lenses provide efficient light diffusion and can be efficiently manufactured utilizing cast coated polymer against a randomly patterned roll.

The preferred transparent polymeric film has concave or convex lenses at an average width between 3 and 60 microns in the x and y direction. When lenses have sizes below I micron the lenses impart a color shift in the light passing through because the lenses dimensions are on the order of the wavelength of light. When the lenses have an average width in the x or y direction of more than 68 microns, the lenses are too large to diffuse the light efficiently. More preferred, the concave or convex lenses have an average width between 15 and 40 microns in the x and y direction. This lens size has been shown to create the most efficient diffusion.

The concave or convex complex lenses comprising minor lenses wherein the diameter of the smaller lenses is preferably less than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. Most preferred are the minor lenses having a width in the x and y direction between 3 and 8 microns. This range has been shown to create the most efficient diffusion.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the transparent polymeric film wherein the polymeric film comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of diffuser sheets for insertion into display devices.

In another embodiment of the invention, the transparent polymeric film wherein the polymeric film comprises a carbonate repeating unit. Polycarbonates have high optical transmission values compared to polyolefin polymers and therefore can improve the brightness of display devices.

In another embodiment of the invention, the transparent polymeric film wherein the polymeric film comprises an olefin repeating unit. Polyolefins are low in cost and have good strength and surface properties.

In another embodiment of the invention, the transparent polymeric film wherein the polymeric film comprises a tri acetyl cellulose. Tri acetyl cellulose has both high optical transmission and low optical birefringence allowing the diffuser of the invention to both diffuse light and reduce unwanted optical patterns.

The preferred diffuse light transmission of the diffuser material of the invention is greater than 50%. Diffuser light transmission less than 45% does not let a sufficient quantity of light pass through the diffuser, thus making the diffuser inefficient. A more preferred diffuse light transmission of the lenslet film is between 80 and 95%. An 80% diffuse transmission allows the LC device to improve battery life and increase screen brightness. The most preferred diffuse transmission of the transparent polymeric film is greater than 92%. A diffuse transmission of 92% allows diffusion of the back light source and maximizes the brightness of the LC device significant improving the image quality of an LC device for outdoor use where the LC screen must compete with natural sunlight.

Preferably, the concave or convex lenses are semi-spherical meaning that the surface of each lenslet is a sector of a sphere, but not necessarily a hemisphere. This provides excellent even diffusion over the x y plane. The semi-spherical shaped lenses scatter the incident light uniformly, ideal for a backlit display application where the display area need to be lit uniformly.

In another embodiment of the invention, the concave or convex lenses are aspherical meaning that width of the lenses differ in the x and y direction. This scatters light selectively over the x y plane. For example, a particular x y aspect ratio might produce an elliptical scattering pattern. This would be useful in the front of a LC display, spreading the light more in the horizontal direction than the vertical direction for increased viewing angle.

The convex or concave lenses preferably have a height/diameter ratio of between 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of between 0.25 to 0.48. It has been proven that the most efficient diffusion occurs in this range.

The number of minor lenses per major lens is preferably between 2 and 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred is 5 to 18 minor lenses per major lens. This range has been shown to produce the most efficient diffusion.

The thickness of the transparent polymeric film preferably is less than 250 micrometers or more preferably between 12.5 and 50 micrometers. Current design trends for LC devices are toward lighter and thinner devices. By reducing the thickness of the light diffuser to less than 250 micrometers, the LC devices can be made lighter and thinner. Further, by reducing the thickness of the light diffuser, brightness of the LC device can be improved by reducing light transmission. The more preferred thickness of the light diffuser is between 12.5 and 50 micrometers which further allows the light diffuser to be convienently combined with a other optical materials in an LC device such as brightness enhancement films. Further, by reducing the thickness of the light diffuser, the materials content of the diffuser is reduced.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble.

Polymer sheet for the transparent polymeric film comprising a plurality of convex and/or concave complex lenses on a surface thereof are generally dimensionally stable, optically clear and contain a smooth surface. Biaxially oriented polymer sheets are preferred as they are thin and are higher in elastic modulus compared to cast coated polymer sheets. Biaxially oriented sheets are conveniently manufactured by co-extrusion of the sheet, which may contain several layers, followed by biaxial orientation. Such biaxially oriented sheets are disclosed in, for example, U.S. Pat. No. 4,764,425.

Suitable classes of thermoplastic polymers for the transparent polymeric film include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Polyolefins particularly polypropylene, polyethylene, polymethylpentene, and mixtures thereof are preferred. Polyolefin copolymers, including copolymers of propylene and ethylene such as hexene, butene and octene are also preferred. Polypropylenes are most preferred because they are low in cost and have good strength and surface properties.

Preferred polyesters for the transparent polymeric film of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. Nos. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides for the transparent polymeric film include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof Copolymers of vinyl resins can also be utilized.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda is preferably added to a polyester skin layer to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1–4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

FIG. 1 illustrates a cross section of a variable light diffusion film suitable for use in a liquid crystal display device. Variable light diffusion film 12 comprises transparent polymer base 20, onto which major lenses 22 are applied to the surface of transparent polymer base 26. Minor lenses 24 are on the surface of the major lens 22. Intricate complex lens 30 has a larger height to width ratio and has more minor lenses per major lens than simpler complex lens 32, which has a smaller height to width ratio and has less minor lenses per major lens. These variations in the geometry and number of minor lenses per major lens, along with frequency of complex lenses, produce the macro diffusion efficiency variation. The invention comprises a plurality of minor lenses 24 on the surface of the major lens 22. The light diffuser of the invention contains many diffusion surfaces from the major lens 22 and the minor lenses 24. On the transparent polymer base 20, opposite the complex lenses 30, alternating layers of polymer 2,4,6, and 8 are applied to form the optical filtering element of the invention. Layers 2 and 6 have approximately the same thickness index of refraction. Layers 4 and 8 have approximately the same thickness and index of refraction. The index of refraction difference between layers 2 and 4 is 0.08 yielding a color filter that provides a blue hue to white light. The color filtering that is accomplished by the invention is determined by the number of alternating layers 2 and 4, the index of refraction difference between the alternating layers and the thickness of alternating layer pairs 2 and 4.

Microvoided light diffusers have also been shown to provide excellent diffusion of illumination light energy. The microvoided diffuser material are bulk diffusers and are particularly useful when the diffuser is required to be in optical contact with additional optical components. For light diffuser of the invention, micro-voided composite biaxially oriented polyolefin sheets are preferred and are manufactured by coextrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869, the disclosure of which is incorporated for reference. polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 micrometer to 200 micrometer. The polymer sheet desirably has a percent transmission greater than 65%.

The thermoplastic diffuser of the invention is preferably provided with one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by coextrusion of the core and thin layers, followed by biaxial orientation, whereby voids are formed around void-initiating material contained in the thin layers.

Polyester microvoided light diffusers are also preferred as oriented polyester has excellent strength, impact resistance and chemical resistance. The polyester utilized in the invention should have a glass transition temperature between about 50° C. and about 150° C., preferably about 60–100° C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The coextrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

Additional layers preferably are added to the microvoided polyester diffusion sheet which may achieve a different effect. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property.

The diffuser sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The lenslet diffuser film may also be used in conjunction with another light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The diffuser sheet of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or a metal oxide or a filler.

The lenslet diffuser film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n^*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n^*d$ since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a transparent polymeric film.

A chill roller is manufactured by a process including the steps of electroplating a layer of copper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the lenslet diffuser film of the present invention can be used e.g. as a retroreflective member for a traffic sign. It can be used in a state applied to a car, a bicycle, person; etc.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction. The diffuser acts to spread the light to increase viewing angle.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The invention has been described in detail with particular reference to certain preferred embodiments thereof, but it will be understood that variations and modifications can be effected within the spirit and scope of the invention.

EXAMPLES

In this example, a complex lens light diffuser containing the optical filtering element of the invention was created by extrusion casting an extrusion grade polyolefin polymer against a pattered chill roll containing the complex lens geometry and coating the optical filtering element on the side opposite the light diffusion lenses. This example will show that complex surface lenses formed on a transparent polymer web material provide exceptional light diffusion compared to a random prior art light diffuser utilizing a dispersion of spherical beads in an acrylic matrix. Further, it will be obvious that the optical element of the invention provides filtering of a diffuse CCFL light source.

A patterned chill roll was manufactured by a process including the steps of electroplating a layer of copper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex. The single lens patterned roll (control) was manufactured by starting with a copper roll blank and grit blasted with size 14 spherical grit at a pressure of 310 MPa. The resulting single lenses on the surface of the roll were concave. The light director was a 45 degree wedge uniformly machined to a depth of 15 micrometers.

The patterned chill roll containing both the complex diffusion lenses and the light director was utilized to create light diffusion sheets by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 97.2%. The polyolefin cast coating coverage was 25.88 g/m$^2$.

The invention material containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers. The side opposite the light diffusion lenses was coated with alternating layers of a 1.55 index of refraction polypropylene and a 1.65 index of refraction PET both measured for index of refraction utilizing 550 nanometer light. The thickness of the optical filtering element are listed in Table 1 below:

TABLE 1

| Layer | Polymer | Thickness (nanometers) |
| --- | --- | --- |
| 1 | PET | 230 |
| 2 | Polypropylene | 120 |
| 3 | PET | 100 |
| 4 | Polypropylene | 120 |
| 5 | PET | 100 |
| 6 | Polypropylene | 120 |

The structure of the cast coated diffusion sheet containing the optical filtering element of the invention is as follows,
Formed polyolefin complex diffusion lenses
Transparent polyester base
Optical filtering element The invention diffusion material was then slit such that the light director was at the perimeter of a square 30 cm sheet. Both the invention material from above and a prior polymer light diffuser containing 8 micrometers polymer beads in an acrylic binder layer coated on a polyester web material were measured for % light transmission, % diffuse light transmission, % specular light transmission, % diffuse reflectance, % light transmission at 400, 500, 500 and 700 nanometers.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention, control and prior art materials are listed in Table 2 below.

TABLE 2

| Measurement | Invention (Complex Lens with Color Filter) | Control (Prior Art) |
| --- | --- | --- |
| Total transmission measured at 500 nm | 92.6 | 66.7 |
| Diffuse transmission measured at 500 nm | 88.2 | 65.7 |
| Spectral transmission measured at 500 nm | 4.5 | 1.0 |
| Diffuse reflectance measured at 500 nm | 3.9 | 33.3 |
| % Transmission at 400 nm | 82.4 | 67.7 |
| % Transmission at 500 nm | 92.6 | 67.7 |
| % Transmission at 600 nm | 81.0 | 67.7 |
| % Transmission at 700 nm | 79.1 | 67.7 |

As the data above clearly indicates, complex polymer lenses formed on the surface of a transparent polymer provide excellent light diffusion and % transmission allowing for brighter liquid crystal display devices. The diffuse light transmission of 88.2% for the invention material is significantly better than the prior art materials (65.7%). The complex lens of the invention provides significantly more curved surface area for transmitted light diffusion compared to a single lens (one curved surface) and the prior art materials (one curved surface). Diffuse light transmission is important factor in the quality of a LC device in that the diffusion sheet must mask the pattern of the light guide common to LC devices. The total light transmission of the invention of 92.6% is significantly improved over the prior art materials. By providing a lens that reduces internal scattering and reflection back toward the source, the invention materials allow for 92.6% of the light energy to pass through the diffuser resulting in a brighter liquid crystal display.

The invention material combined high total transmission with high diffuse light transmission. This created a diffusion film that masked the pattern of the light guide while allowing most of the light through the film to enable a brighter LC display. The prior art sample, most of the light exiting the film was diffuse thus masking the pattern of the light guide. Though the light exiting was almost totally diffuse, the total transmission measurement was low blocking light and creating an unacceptably dark display. Light through the prior art sample was also wasted by a large percent of reflection.

The invention materials containing the optical filter provided different transmission depending on the wavelength while the control material had a constant transmission as a function of wavelength. The light filtering, the result of the alternating layers containing polymers with differing index of refraction, was able to pass more blue light and filter more red light. The invention material, because the ability to pass more blue light, provides for a pleasing blue hue to the illumination light source thus improving the quality of display devices as consumers prefer light with a blue hue compared to light that contains yellows or reds. The color filtering was done in combination with light diffusion making the invention materials ideal for improving the quality of light in rear illuminated devices.

While this example was primarily directed toward the use of thermoplastic light diffusion materials for LC devices, the materials of the invention have value in other diffusion applications such as back light display, imaging elements containing a diffusion layer, a diffuser for specular home lighting and privacy screens, front projection displays, image capture diffusion lenses and greenhouse light diffusion, light bulbs, polarization films, light guides, transflectors and image capture films.

PARTS LIST

2. High refractive index polymer
4. Low refractive index polymer
6. High refractive index polymer
8. Low refractive index polymer
12. Light diffuser containing fringe filter
20. Transparent polymer base
22. Major lens
24. Minor lens
26. Surface of transparent polymer base
28. Polymer light director
30. Intricate complex lens
32. Simple complex lens
40. Wavelength vs transmission curve
50. Wavelength vs transmission curve

What is claimed is:

1. An optical element comprising in order a light source, air, at least one thin layer having a thickness of 80 to 200 nm, and a thick layer, each layer varying in refractive index (RI) by at least 0.05 from the next adjacent layer, in an alternating manner, wherein said optical element further comprises a light diffuser, comprising a transparent polymeric film having a top and bottom surface comprising a plurality of complex lenses on at least one surface thereof.

2. The optical element of claim 1 wherein said adjacent layers vary from each other in RI by at least 0.10.

3. The optical element of claim 1 wherein said optical element comprises from 3 to 8 layers.

4. The optical element of claim 1 wherein said optical element comprises from 3 to 30 layers.

5. The optical element of claim 1 wherein said thick layer has a thickness from grater than 200 to 1000 nanometers.

6. The optical element of claim 1 wherein said thick layer has a thickness from 1000 to 5000 nanometers.

7. The optical element of claim 1 wherein said optical element provides colored light.

8. The optical element of claim 7 where said colored light comprises a half-bandwidth from 10 to 70 nm.

9. The optical element of claim 1 wherein said optical element provides a chromatic transmission peak at 570 to 620 nm.

10. The optical element of claim 1 wherein said optical element provides a chromatic transmission peak at 630 to 690 and 425 to 480 nm.

11. The optical element of claim 1 wherein said optical element provides a chromatic transmission peak at 480 to 520 nm.

12. The optical element of claim 1 wherein said optical element provides a chromatic transmission peak at 630 to 690 nm.

13. The optical element of claim 1 wherein said optical element provides a chromatic transmission peak at 525 to 590 nm.

14. The optical element of claim 1 wherein said optical element provides a chromatic transmission peak at 425 to 480 nm.

15. The optical element of claim 1 wherein the optical element has a thickness from 300 nanometers to 3000 nanometers.

16. The optical element of claim 1 wherein said layers comprise polymers.

17. The optical element of claim 1 wherein said alternating layers comprise PEN, silicone and polycarbonate.

18. The optical element of claim 1 wherein said alternating layers comprise polycarbonate, cellulose acetate and polyester.

19. The optical element of claim 1 wherein said optical element is applied to the surface of glass.

20. The optical element of claim 1 wherein said optical element is applied to the surface of a light guide.

21. The optical element of claim 1 wherein said optical element is applied to the surface of a polymer prism sheet.

22. The optical element of claim 1 wherein said optical element is applied to the surface of a reflective surface.

23. The optical element of claim 1 wherein said optical element is applied to the surface of a transflective surface.

24. The optical element of claim 1 wherein said optical element is applied to the surface of a light bulb.

25. The optical element of claim 1 wherein said optical element is applied to the surface of a transparent polymer sheet.

26. The optical element of claim 1 wherein said optical element is applied to the surface of a polarization film.

27. The optical element of claim 1 wherein said optical element is applied to the surface of low birefingent cellulose acetate.

28. The optical element of claim 1 wherein said light diffuser has a % transmission greater than 90%.

29. The optical element of claim 1 wherein said light diffuser has a haze greater than 85%.

30. The optical element of claim 1 wherein said light diffuser comprises a microvoided polymer.

31. The optical element of claim 1 wherein the light diffuser comprises complex lenses which are randomly distributed on the surface.

32. A back lighted device comprising a light source and an optical element comprising in order a light source, air, at least one thin layer having a thickness of 80 to 200 nm, and a thick layer, each layer varying in refractive index (RI) by at least 0.05 from the next adjacent layer in an alternating manner and having a diffuse light transmission of at least 75%, wherein said optical element further comprises a light diffuser comprising a transparent polymeric film having a top and bottom surface comprising a plurality of complex lenses on at least one surface thereof.

33. The back lighted device of claim 32 wherein the optical element the optical element contains adjacent layers that vary from each other in RI by at least 0.10.

34. The back lighted device of claim 32 wherein said optical element comprises from 3 to 30 layers.

35. The back lighted device of claim 32 wherein said optical element is applied to the surface of a polymer prism sheet.

36. The back lighted device of claim 32 wherein said optical element is applied to the surface of a polarization film.

37. The back lighted device of claim 32 wherein said optical element is applied to the surface of low birefingent cellulose acetate.

* * * * *